(12) United States Patent
Li et al.

(10) Patent No.: US 10,402,532 B1
(45) Date of Patent: Sep. 3, 2019

(54) METHODS, SYSTEMS, AND COMPUTER PROGRAM PRODUCTS FOR IMPLEMENTING AN ELECTRONIC DESIGN WITH ELECTRICAL ANALYSES WITH COMPENSATION CIRCUIT COMPONENTS

(71) Applicant: Cadence Design Systems, Inc., San Jose, CA (US)

(72) Inventors: Yujia Li, Marina Del Rey, CA (US); Xiaohai Wu, Fremont, CA (US); An-Chang Deng, Saratoga, CA (US)

(73) Assignee: Cadence Design Systems, Inc., San Jose, CA (US)

( * ) Notice: Subject to any disclaimer, the term of this patent is extended or adjusted under 35 U.S.C. 154(b) by 232 days.

(21) Appl. No.: 15/093,619

(22) Filed: Apr. 7, 2016

(51) Int. Cl.
*G06F 17/50* (2006.01)

(52) U.S. Cl.
CPC ...... *G06F 17/5081* (2013.01); *G06F 17/5009* (2013.01); *G06F 17/5045* (2013.01); *G06F 2217/78* (2013.01)

(58) Field of Classification Search
None
See application file for complete search history.

(56) References Cited

U.S. PATENT DOCUMENTS

| | | | | |
|---|---|---|---|---|
| 5,787,008 A * | 7/1998 | Pullela | ................. | G06F 17/505 703/19 |
| 5,878,053 A * | 3/1999 | Koh | .................... | G06F 17/5036 703/18 |
| 5,943,487 A * | 8/1999 | Messerman | ......... | G06F 17/5081 716/112 |
| 6,311,147 B1 * | 10/2001 | Tuan | .................. | G01R 31/2848 257/E23.079 |
| 6,374,205 B1 * | 4/2002 | Kuribayashi | ....... | G06F 17/5036 703/14 |
| 6,671,862 B1 * | 12/2003 | Seward | ............... | G06F 17/5036 716/113 |
| 6,763,504 B2 * | 7/2004 | Rao | ...................... | G06F 17/5036 716/113 |
| 6,832,182 B1 * | 12/2004 | Wilson, Jr. | .......... | G06F 17/5036 703/13 |
| 6,940,293 B2 * | 9/2005 | Ramarao | ............. | G06F 17/5031 324/617 |

(Continued)

OTHER PUBLICATIONS

Qian, Haifeng, Sani R. Nassif, and Sachin S. Sapatnekar. "Random walks in a supply network." Proceedings of the 40th annual Design Automation Conference. ACM, 2001, pp. 93-98.

(Continued)

*Primary Examiner* — Leigh M Garbowski
(74) *Attorney, Agent, or Firm* — Vista IP Law Group, LLP

(57) ABSTRACT

Various techniques implement an electronic design with electrical analyzes with compensation circuit components. A power pin of a power net may be identified in an electronic design. The electronic design may be reduced into a reduced electronic design at least by applying one or more circuit reduction techniques to at least a portion of the electronic design. At least one load device of a plurality of load devices in the reduced electronic design may be transformed into a transformed load device. One or more design closure tasks may be performed on the electronic design using at least the reduced electronic design and the transformed load device.

20 Claims, 13 Drawing Sheets

(56) References Cited

U.S. PATENT DOCUMENTS

| | | | | |
|---|---|---|---|---|
| 7,047,163 B1* | 5/2006 | Chakraborty | G06F 17/5045 | 703/2 |
| 7,143,014 B2* | 11/2006 | Upreti | G06F 17/5036 | 703/2 |
| 7,243,313 B1* | 7/2007 | Qin | G06F 17/5036 | 716/113 |
| 7,277,804 B2* | 10/2007 | Gebbie | G06F 17/5036 | 702/65 |
| 7,283,943 B1* | 10/2007 | Qi | G06F 17/5036 | 703/14 |
| 7,509,596 B2* | 3/2009 | Koo | G06F 17/5009 | 703/14 |
| 7,698,677 B2* | 4/2010 | Zhao | G06F 17/5077 | 716/122 |
| 7,774,174 B2* | 8/2010 | Sheehan | G06F 17/5036 | 703/14 |
| 7,987,439 B2* | 7/2011 | Che | G06F 17/5036 | 703/14 |
| 8,165,861 B2* | 4/2012 | Guedon | G06F 17/5018 | 703/13 |
| 8,453,102 B1* | 5/2013 | Pack | G06F 17/505 | 716/139 |
| 8,476,553 B2* | 7/2013 | Usuda | B23K 26/0057 | 219/121.62 |
| 8,555,235 B2* | 10/2013 | Oh | G06F 17/5068 | 716/106 |
| 8,595,677 B1* | 11/2013 | Shu | G06F 17/5036 | 716/100 |
| 8,954,917 B1* | 2/2015 | Shu | G06F 17/5036 | 716/100 |
| 2003/0106030 A1* | 6/2003 | Keller | G06F 17/5036 | 716/115 |
| 2009/0032903 A1* | 2/2009 | Correale, Jr. | G06F 17/5045 | 257/510 |

OTHER PUBLICATIONS

Li, Hong, et al. "Efficient analysis of large-scale power grids based on a compact Cholesky factorization." Quality Electronic Design, 2007. ISQED'07. 8th International Symposium on. IEEE, 2007, 6 pages.

Nassif, Sani R., and Joseph N. Kozhaya. "Fast power grid simulation." Proceedings of the 37th Annual Design Automation Conference. ACM, 2000, pp. 156-161.

Zhao, Min, et al. "Hierarchical analysis of power distribution networks" IEEE Transactions on Computer-Aided Design of Integrated Circuits and Systems 21.2 (2002): 159-168.

Li, Hang, et al. "Partitioning-based approach to fast on-chip decoupling capacitor budgeting and minimization." IEEE Transactions on Computer-Aided Design of Integrated Circuits and Systems 25.11 (2006): 2402-2412, pp. 1-9.

Su, Haihua, Emrah Acar, and Sani R. Nassif. "Power grid reduction based on algebraic multigrid principles." Proceedings of the 40th annual Design Automation Conference. ACM, 2003, pp. 109-112.

* cited by examiner

US 10,402,532 B1

METHODS, SYSTEMS, AND COMPUTER PROGRAM PRODUCTS FOR IMPLEMENTING AN ELECTRONIC DESIGN WITH ELECTRICAL ANALYSES WITH COMPENSATION CIRCUIT COMPONENTS

BACKGROUND

The recent advances in very deep sub-micron (VDSM) integrated circuits (ICs) have brought new challenges in the electronic design methodologies. In modern electronic circuits, the total number of transistors have increased; geometries have become smaller; and clock frequencies have increased over time. IR-drop in a power net supplying power to a chip has been found to have more critical impact on the timing behavior of the chip. Inaccurate capturing of the IR-drop in a power net may thus cause an electronic design to deviate from the timing requirements in physical optimizations and corrections, not to mention the lack of characterizing the IR-drop in the power net. For example, a Vdd power net may exhibit 100 mV IR-drop that may cause the timing behavior through a single MOS device to deviate by tens of picoseconds, especially when considering that a common power net in an integrated circuit (IC) may include many hundreds of thousands of Vdd and Vss nodes. The aggregated deviation in timing through a collection of such devices may simply cause an electronic design to fail the timing requirements. This problem is exacerbated due to the ever increase in the sizes of and complexities in power nets.

Some conventional approaches model the power net with individual circuit components. Although these approaches may achieve satisfactory accuracy, these conventional approaches are impractical to cope with the sizes and complexities of modern electronic designs. That is, these conventional approaches not only require much more computational resources but also often cannot produce useful results in a timely manner to satisfy the time-to-market requirement. Some other approaches adopt various circuit reduction techniques to reduce the size of a power net for electrical analyses. These other approaches are more efficient from the computer runtime perspective but at the price of accuracy and thus present marginal benefits over the former conventional approaches. Some of these approaches try to balance between accuracy and performance and employ conservative circuit reduction techniques with relatively low reduction ratios in sizes. These approaches offer inferior performance than approaches with aggressive circuit reduction techniques and inferior accuracy than approaches modeling details of the power net.

Moreover, some circuit reduction techniques often combine multiple nodes into a single node that assumes a single voltage value whereas the voltage values at these multiple nodes may in fact differ from each other by tens of millivolts in the actual design. These reduction techniques combining multiple nodes into a single node may thus cause further deviation in the electrical analysis results and thus further impact the timing behavior. Some other approaches adopt a multi-level electrical analysis methodology where the first level electrical analysis is performed upon the assumption of an ideal power supply, and the subsequent stage of electrical analysis uses the results from the first stage to characterize the electrical characteristics of an electronic circuit. These approaches may achieve somewhat satisfactory results only when the assumption is valid or when the underlying electronic circuit is relatively benign not to be affected by such an unrealistic assumption.

Therefore, it is important for an EDA tool to adequately and accurately perform electrical analyses to correctly and efficiently capture potential IR drop in an electronic design.

SUMMARY

Disclosed are method(s), system(s), and article(s) of manufacture for implementing an electronic design with electrical analyses with compensation circuit components in one or more embodiments. Some embodiments are directed at a method for implementing a post-layout electronic design with electrical analyses with compensation circuit components. In these embodiments, a power pin of a power net may be identified in an electronic design. The electronic design may be reduced into a reduced electronic design at least by applying one or more circuit reduction techniques to at least a portion of the electronic design. At least one load device of a plurality of load devices in the reduced electronic design may be transformed into a transformed load device. One or more design closure tasks may be performed on the electronic design using at least the reduced electronic design and the transformed load device.

In some of these embodiments, a reduced power net may be generated at least by applying the one or more circuit reduction techniques to the power net. A first equivalent electrical characteristic may be computed between the power pin and a power input pin of a load device connected via the power net; and a second equivalent electrical characteristic may be computed between the power pin and the power input pin of the load device connected via the reduced power net. A port mapping may be optionally generated between the power net and the reduced power net.

In addition or in the alternative, a compensation circuit component may be identified for the load device connected to the reduced power net. A compensation value for the compensation circuit component may be determined at least by comparing the first equivalent electrical characteristic and the second equivalent electrical characteristic. The compensation circuit component may then be inserted between the load device and the reduced power net.

In some of these immediately preceding embodiments, a modification factor for the load device may be determined based in part or in whole upon the load device or the compensation circuit component; and the load device and the compensation circuit component may be transformed into a transformed load device by using at least the modification factor. Optionally, the reduced electronic design may be modified into a modified reduced electronic design at least by replacing the load device with the transformed load device.

Additionally or alternatively, two or more load devices connected in parallel to the reduced power net may be identified; a different compensation circuit component connected to the reduced power net and the two or more load devices may be identified; and the reduced electronic design may be modified at least by inserting a modified compensation circuit component between the reduced power net and each load device of the two or more load devices based in part or in whole upon the different compensation circuit component.

In some of these immediately preceding embodiments, the each load device and the modified compensation circuit component may be transformed into a different transformed load device by using at least the modification factor; and the reduced electronic design may be modified into a modified reduced electronic design at least by replacing the each load device and the different compensation component with the different transformed load device.

Some embodiments are directed at a hardware system that may be invoked to perform any of the methods, processes, or sub-processes disclosed herein. The hardware system may include at least one processor or at least one processor core, which executes one or more threads of execution to perform any of the methods, processes, or sub-processes disclosed herein in some embodiments. The hardware system may further include one or more forms of non-transitory machine-readable storage media or devices to temporarily or persistently store various types of data or information. Some exemplary modules or components of the hardware system may be found in the System Architecture Overview section below.

Some embodiments are directed at an article of manufacture that includes a non-transitory machine-accessible storage medium having stored thereupon a sequence of instructions which, when executed by at least one processor or at least one processor core, causes the at least one processor or the at least one processor core to perform any of the methods, processes, or sub-processes disclosed herein. Some exemplary forms of the non-transitory machine-readable storage media may also be found in the System Architecture Overview section below.

BRIEF DESCRIPTION OF THE DRAWINGS

The drawings illustrate the design and utility of various embodiments of the invention. It should be noted that the figures are not drawn to scale and that elements of similar structures or functions are represented by like reference numerals throughout the figures. In order to better appreciate how to obtain the above-recited and other advantages and objects of various embodiments of the invention, a more detailed description of the present inventions briefly described above will be rendered by reference to specific embodiments thereof, which are illustrated in the accompanying drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION

Figure 1:
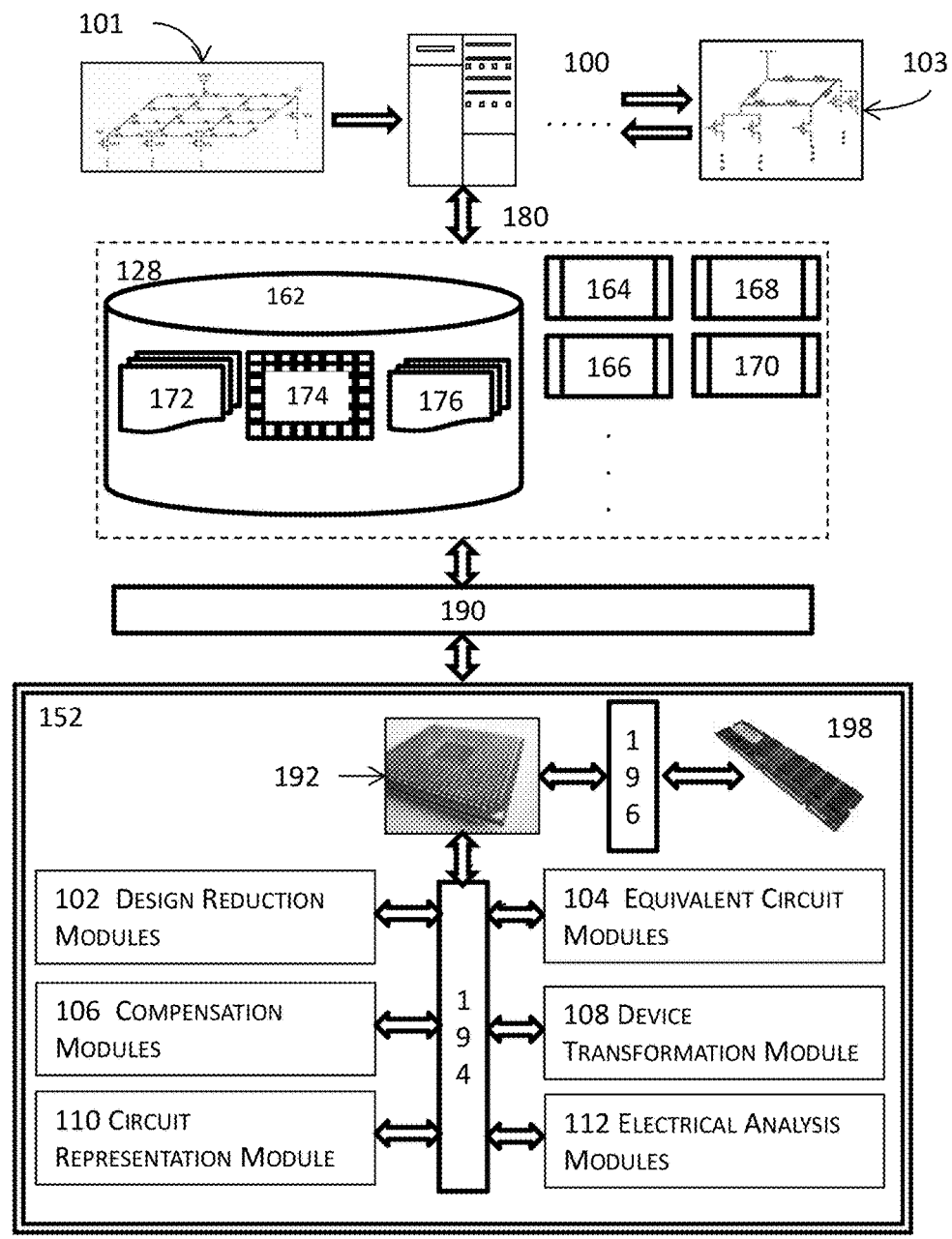
FIG. 1 illustrates a high level block diagram of a hardware system for implementing an electronic design with electrical analyses with compensation circuit components in one or more embodiments.

Various embodiments of the invention are directed to methods, systems, and articles of manufacture for implementing an electronic design with electrical analyses with compensation circuit components. Other objects, features, and advantages of the invention are described in the detailed description, figures, and claims.

In some embodiments, the techniques described herein identify an electronic design or a portion thereof including a power net or a virtual power net driving a plurality of load devices. One or more first equivalent electrical characteristics between a power supply pin and the input port (Pi) of each of the plurality of load devices may be computed and stored. The power net may be reduced or simplified into a reduced power net driving the same plurality of load devices by applying one or more circuit reduction techniques. It shall be noted that for the ease of description, both a power net and a virtual power net will be collectively referred to as a power net although these techniques described herein apply with full and equal effects to both power nets and virtual power nets. It shall be further noted that various embodiments and examples described herein will refer to equivalent resistances for these one or more equivalent electrical characteristics although these techniques described herein also applied to other types of equivalent electrical characteristics.

The reduced power has fewer nodes (Nj) than the power net having more nodes (Ni where Ni>Nj). A mapping may be established from the nodes Ni of the power net to the corresponding nodes Nj of the reduced power net. A reverse mapping from the nodes Nj in the reduced power net to the corresponding nodes Ni in the power net may also be constructed. The mapping and the reverse mapping allow cross reference between the power net and the reduced power net. The connectivity information of the electronic design may be maintained by updating the connectivity information with the identifications of nodes to which the input ports (Pi) of the plurality of load devices are respectively connected.

One or more second equivalent resistances may be similarly computed between the power supply pin and each of the input ports of the plurality of load devices using the reduced power net. The discrepancies between the first and the second equivalent resistances due to the application of circuit reduction techniques may be recaptured by inserting a compensation circuit component (e.g., a compensation resistor) between the input port of a load device and a corresponding node to which the load device is connected. In some embodiments where a load device is a field-effect transistor (e.g., a metal-oxide-semiconductor field-effect transistor or MOS device), this MOS device load device may be transformed into a transformed load device (e.g., a transformed MOS device) by grouping the compensation circuit component and the connected compensation circuit component as the transformed load device. The electrical characteristics of the transformed MOS device may be determined by looking up the corresponding electrical characteristics of the original MOS device and further by multiplying the corresponding electrical characteristics with a scaling factor.

Various electrical analyses may then be performed for the electronic design with the reduced power net and the transformed load devices to accurately capture the IR drop in the power net while using much shorter runtime. When compared to state of the art electrical analysis methodologies on real-world electronic designs, these techniques demonstrate about 200-times improvement in the number of Vdd and Vss nodes with nearly 3-times improvement on errors while the runtime is reduced to nearly 1/10 over the most accurate (with smaller reduction ratios) as well as most aggressive (with lower accuracy) conventional approaches.

One of the advantages of these techniques described herein is that unlike conventional approaches, the performance and accuracy of these techniques described herein are not sensitive to the RC reduction techniques and may thus employ any RC reduction techniques ranging from conservative to extremely aggressive ones having very high reduction ratios while producing results with substantially identical accuracy. Another advantage is that with the omnipresent use of MOS devices as load devices, a part of the power net IR drop impact may be characterized by using transformed load devices whose electrical characteristics may be determined by multiplying the original, non-transformed MOS device electrical characteristics, which may easily looked up from, for example, a technology file, with a corresponding scaling factor.

Another advantage of these techniques is that the electrical analysis of both the power net and the connected transistors may be performed in a single, one-pass analysis, instead of a multi-stage analysis that performs subsequent stage analysis using a preceding stage analysis results with some unrealistic or unattainable assumptions that often cause undesirable results. Another advantage of these techniques is that the size of the power net may be greatly reduced by using an aggressive RC reduction technique, and that the reduced power net may thus be used for efficient analysis or simulation methodologies (e.g., fast SPICE or equivalents). Another advantage is that these techniques may capture both the IR drop effects in the power net as well as the power gate switching effects.

Various embodiments will now be described in detail with reference to the drawings, which are provided as illustrative examples of the invention so as to enable those skilled in the art to practice the invention. Notably, the figures and the examples below are not meant to limit the scope of the present invention. Where certain elements of the present invention may be partially or fully implemented using known components (or methods or processes), only those portions of such known components (or methods or processes) that are necessary for an understanding of the present invention will be described, and the detailed descriptions of other portions of such known components (or methods or processes) will be omitted so as not to obscure the invention. Further, various embodiments encompass present and future known equivalents to the components referred to herein by way of illustration.

FIG. 1 illustrates a high level block diagram of a system for implementing an electronic design with electrical analyses with compensation circuit components in one or more embodiments. In these one or more embodiments, FIG. 1 illustrates a high level block diagram of a hardware system and may comprise one or more computing systems 100, such as one or more general purpose computers described in the System Architecture Overview section, to implement various intended functions and to achieve desired results.

In some embodiments, the one or more computing systems 100 may invoke various system resources such as the processor(s) or processor core(s), memory, disks, etc. The one or more computing systems 100 may also initiate or interact with other computing systems to access, via a computer bus architecture (e.g., a system bus, a control bus, a data bus, or any combinations thereof), various resources 128 that may comprise a floorplanner, a global routing engine, and/or a detail routing engine 164, a layout editor 166, a design rule checker 168, a verification engine 170, etc.

The one or more computing systems 100 may further write to and read from a local or remote non-transitory computer accessible storage 162 that stores thereupon data or information such as, but not limited to, one or more databases (174) such as schematic design database(s) or physical design database(s), electronic circuit design specification database(s), various statistics, various data, rule decks, various design rules, constraints, etc. (172), or other information or data (176) that may be used to facilitate the performance of various functions to achieve the intended purposes.

In some embodiments, the computing system 100 may include these various resources 128 such that these various resources may be invoked from within the computing system via a computer bus 180 (e.g., a data bus interfacing a microprocessor 192 and the non-transitory computer accessible storage medium 198 or a system bus 190 between a microprocessor 192 and one or more engines in the various resources 128). In some other embodiments, some or all of these various resources may be located remotely from the computing system 100 such that the computing system may access the some or all of these resources via a computer bus 180 and one or more network components.

In some embodiments, the one or more computing systems 100 may include or, either directly or indirectly through the various resources 128, invoke a set of modules 152 including hardware and software modules or combinations of one or more hardware and one or more software modules that are stored at least partially in computer memory may comprises one or more design reduction modules 102 to reduce a representation of an electronic design (e.g., an RLC network) into a reduced representation such as an RC reduced (or RCR) network, a capacitance only (C-only) network, a resistance only (R-only) network, etc. of the electronic design. These design reduction modules may include conservative design reduction modules producing relatively conservative reduction in sizes of electronic design as well as aggressive design reduction modules producing relatively greater reduction in sizes of electronic designs.

The set of modules 152 may further include one or more equivalent circuit modules 104 to determine equivalent electrical characteristics between two points in an electronic design. For example, an equivalent circuit module 104 may compute an equivalent resistance between the power supply pin (e.g., Vdd) of a power net and a power pin of a load device.

The set of modules 152 may further include one or more compensation modules 106 to determine and add compensation circuit components to an electronic design. A compensation module functions in tandem with one or more other modules such as the design reduction modules 102 and the equivalent circuit modules 104 to add compensation circuit components to compensate for the loss in accuracy due to the application of a design reduction technique. More details about adding compensation circuit components to an electronic design will be described below with reference to FIGS. 5D-E. In addition or in the alternative, the set of modules 152 may further include one or more device transformation modules 108 to transform various load devices into respective transformed load devices. More details about transforming load devices into corresponding transformed load devices will be described below with reference to FIGS. 5E-F.

In some embodiments, the set of modules 152 may further include one or more circuit representation modules 110 to prepare an electronic design into an analysis model. In an example where a reduced electronic design comprises a reduced power net that further includes respective compensation resistors as well as a plurality of load devices respectively connected to the reduced power net via the respective compensation resistors, a circuit representation module may simply the reduced power net at least by modifying the reduced power net by redefining the reduced power net to exclude the respective compensation resistors and to group the respective compensation resistors with the corresponding plurality of load devices. As described above with reference to 108, each pair of a load device and its corresponding compensation resistor may be transformed into a transformed load device to further simplify and prepare the electronic design into an analysis model for further electrical analyses.

In addition or in the alternative, the set of modules 152 may comprise one or more electrical analysis modules 112 to performing various electrical analyses (e.g., an IR-drop analysis) on an analysis model of an electronic design of interest. The set of modules 152 may further optionally include one or more physical optimization and correction modules, signoff modules, and design closure modules (not shown) to perform various optimization, correction, signoff, and design closure tasks to ensure that the electronic design implemented by various techniques described herein may be successfully fabricated while maintaining various performance, cost, reliability, and manufacturability requirements.

For example, the one or more signoff modules may include one or more timing signoff modules to perform timing analyses and timing closure related tasks (e.g., silicon-accurate timing signoff, signal integrity analyses, etc.) to ensure an electronic design meets power, performance, or other requirements before tapeout, one or more signoff parasitic extraction modules to provide silicon-accurate interconnect parasitic extraction and ensure first-pass silicon success, and one or more power signoff modules to perform various power integrity analyses, transistor-level electromigration analyses, IR-drop analyses, or other power and signal integrity analyses to ensure an electronic design meets or exceeds power, performance, and/or area goals in some embodiments.

The one or more signoff modules may include one or more physical verification modules (not shown) to perform various design rule checking, layout vs. schematic (LVS), etc. tasks to ensure that an electronic design meets or exceeds various spatial and other physical rules and one or more design for manufacturing (DFM) modules to address physical signoff and electrical variability optimization, correct lithography hotspots, predict silicon contours, improve yield, detect and repair timing and leakage hotspots to achieve variation- and manufacturing-aware signoff and design closure in some of these embodiments.

In addition or in the alternative, the one or more signoff modules may include one or more one or more computational lithography modules (not shown) to provide more accurate post-etch critical dimension accuracy and process windows on silicon, reticle and wafer synthesis, etc. to eliminate errors and/or reduce mask-manufacturing cycle times. One or more of these multi-fabric signoff modules may operate on the electronic design produced or modified with various techniques to be described in the following sections for proper signoff and design closure so that the signoff version of the electronic design may be properly manufactured with first-pass or fewer passes silicon success in some embodiments. In these embodiments, the signoff version of the electronic design produced or modified with various techniques described herein causes the underlying electronic circuit to be manufactured by a foundry or IC (integrated circuit) fabrication facility when the signoff version of the electronic design is forwarded to the foundry or IC fabrication facility that in turn fabricates the requisite photomasks and the eventual electronic circuit.

The modules in the set 152 may include or at least function in tandem with a microprocessor 192 via a computer bus 194 in some embodiments. In these embodiments, a single microprocessor 192 may be included in and thus shared among more than one module even when the computing system 100 includes only one microprocessor 192. A microprocessor 192 may further access some non-transitory memory 198 (e.g., random access memory or RAM) via a system bus 196 to read and/or write data during the microprocessor's execution of processes.

Figure 2:
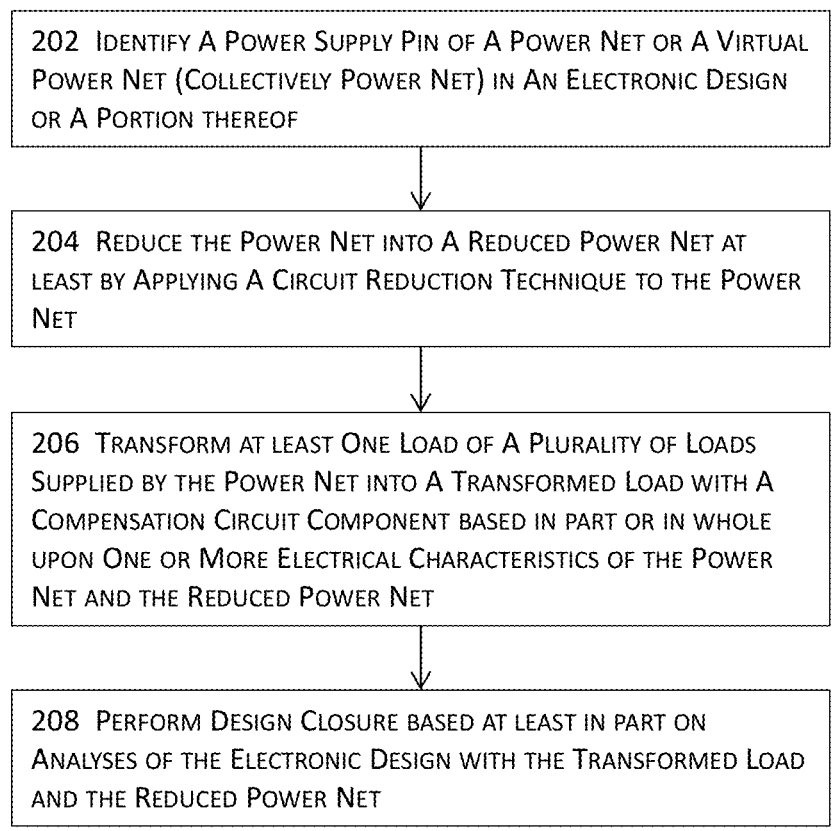
FIG. 2 illustrates a high level block diagram for implementing an electronic design with electrical analyses with compensation circuit components in some embodiments.

FIG. 2 illustrates a high level block diagram for implementing an electronic design with electrical analyses with compensation circuit components in some embodiments. Various embodiments, examples, and drawing figures are described or illustrated herein with reference to IR-drop analyses and compensation resistors for the ease of illustration and description. It shall be noted that these techniques described herein also apply with full and equal effects to other types of electrical analyses and compensation circuit components, and that the recitations of IR-drop and resistors are not intended to limit the scope of the claims or the scope of embodiments including other types of electrical analyses or compensation circuit components, unless otherwise explicitly recited.

In these embodiments illustrated in FIG. 2, the power net of an electronic design of interest may be identified. One or more circuit reduction techniques may be applied to the electronic design to reduce the electronic design into a reduced design. In some embodiments, these one or more circuit reduction techniques are applied to the power net to reduce the power net into a reduced power net having a fewer total number of pins or ports and a fewer total number nodes. The application of a circuit reduction technique may cause differences in in one or more electrical characteristics. These differences between the electronic design and the reduced electronic design may be compensated for by adding one or more compensation circuit components at one or more designated locations. In those embodiments where a circuit reduction technique is applied to reduce the power net into a reduced power net, one or more load devices powered by the reduced power net may be transformed into one or more corresponding transformed load devices. A circuit model including the reduced power net and these one or more transformed load devices may be generated for subsequent electrical analyses, and the results of these electrical analyses may be further referenced in various optimizations, corrections, and closure of the electronic design.

More specifically, a power net or a virtual power net and a power supply pin may be identified at 202 from an electronic design or a portion thereof of interest. The electronic design or the portion thereof is the subject of interest for one or more electrical analyses, and various techniques described herein performs various tasks to generate a circuit representation model to improve the performance and accuracy of these one or more electrical analyses while reducing utilization of computational resources such as runtime and memory footprint. For the ease of description, both a power net and a virtual power net will be collectively referred to as a power net herein.

The identified power net may be reduced at 204 into a reduced power net that contains fewer circuit components by applying one or more circuit reduction techniques to the power net such that the circuit model contains a fewer total number of nodes and pins than the electronic design identified at 202 for one or more subsequent electrical analyses at an electrical analysis module. Various different circuit reduction techniques may be used without compromising the accuracy of the electrical analysis results although different circuit reduction techniques produce different sizes of reduced power nets for the identified power net.

Due to the application of circuit reduction techniques, one or more load devices (e.g., MOS devices) powered by the reduced power net may be transformed at 206 into one or more corresponding transformed load devices with compensation circuit components. The transformation of a load device combines a compensation circuit component with the load device and determines the electrical characteristics of the transformed load device. This compensation circuit component captures and compensates for any differences caused by the application of circuit reduction techniques with respect to the load device. For example, a compensation resistor may be added between the power input pin of a MOS device and the power supply pin to capture the difference in the original resistance between the power input pin of the MOS device and the power supply pin through the power net and the resistance between the same pins through the reduced power net. This compensation resistor captures and compensates for the difference in the resistance values caused by the application of circuit reduction techniques and renders the reduced electronic design insensitive to or immune from the choice of circuit reduction techniques.

Various types of tasks including optimizations such as physical optimizations, timing closure, design closure, etc. may be performed at 208 by using at least the results of one or more analyses such as electrical analyses, design closure, etc. with the one or more transformed load device and the reduced power net.

One of the advantages of these approaches described herein is that an aggressive circuit reduction technique having a large reduction ratio (e.g., a ratio of the original number of nodes or pins to a reduced number of nodes or pins) may be employed to reduce the power net to a much smaller reduced power net while providing identical or substantially similar accuracy as other circuit reduction techniques having smaller reduction ratios due to the additions of compensation circuit components at 206 to the reduced electronic circuit design having a reduced power net. More details about the addition of compensation circuit components will be described below with reference to FIGS. 3 and 5A-5F.

Figure 3A:
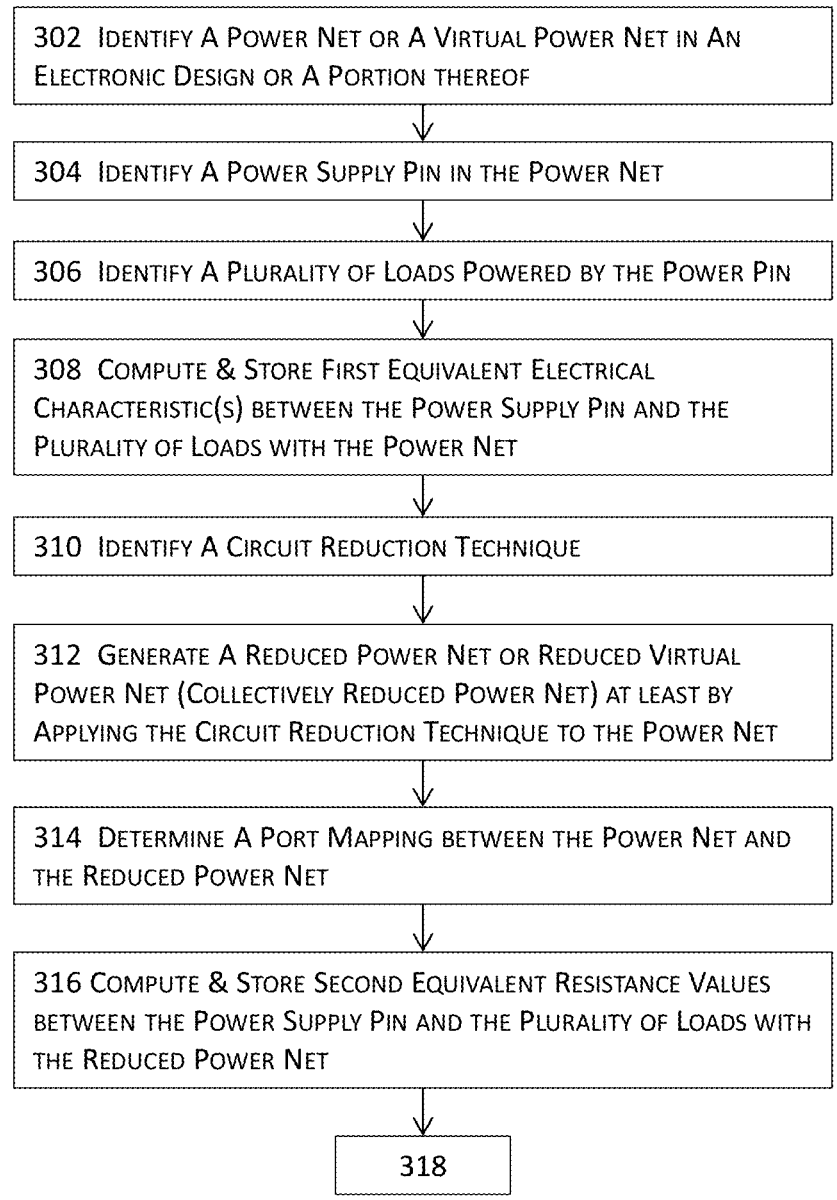
FIGS. 3A-3B jointly illustrate a more detailed block diagram for implementing an electronic design with electrical analyses with compensation circuit components in some embodiments.
Figure 3B:
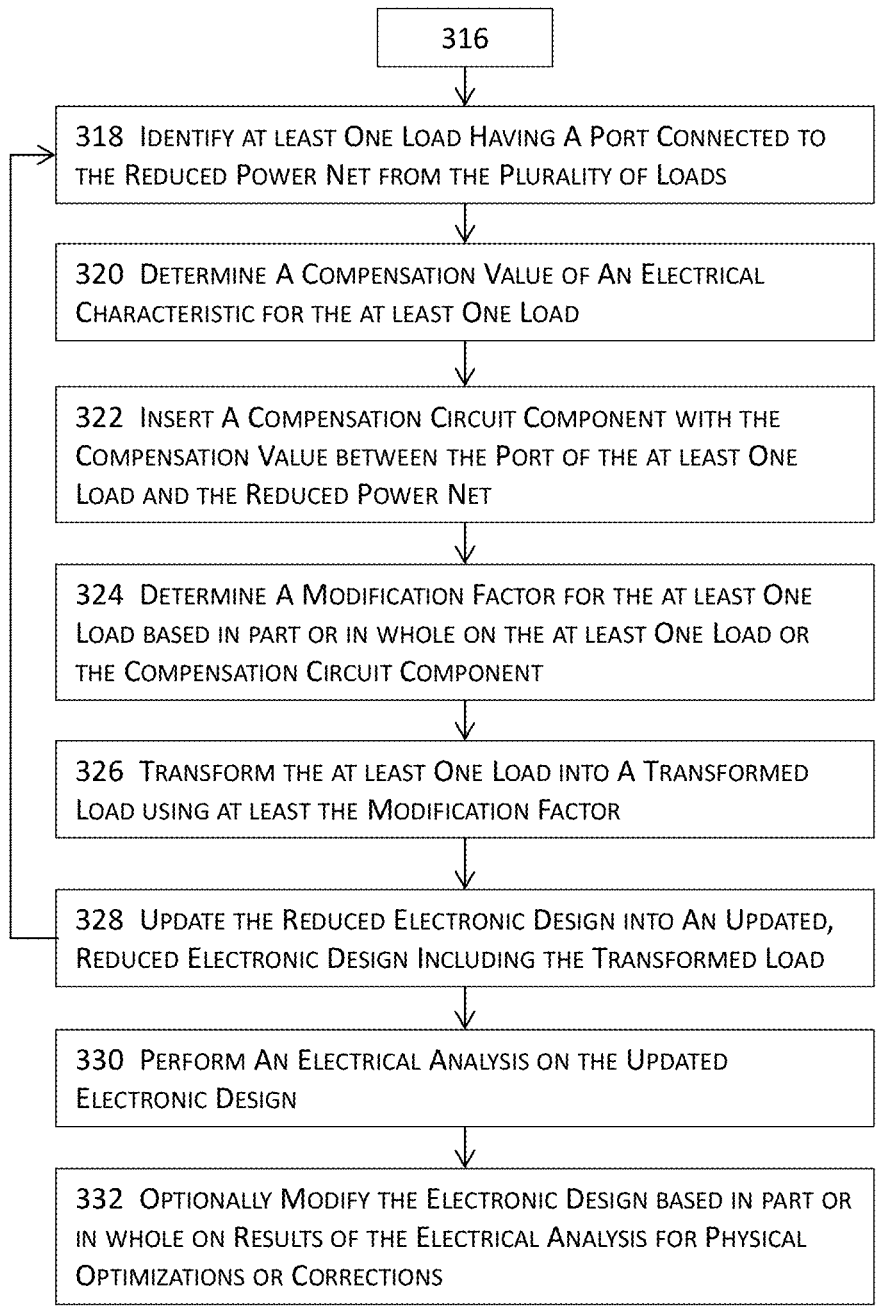

FIGS. 3A-3B jointly illustrate a more detailed block diagram for implementing an electronic design with electrical analyses with compensation circuit components in some embodiments. A power net or a virtual power net and a power supply pin may be identified at 302 from an electronic design or a portion thereof of interest. A power supply pin may be identified at 304. The power supply pin may include, for example, Vdd or Vss for field effect transistors (FETs) or Vcc or Vee for bipolar junction transistors (BJTs), etc. that are connected to the power rails of the electronic design in some embodiments. In some other embodiments, a power pin may include a pin or port supplying power to a MOS device that acts as a switch for a virtual power net powered through the MOS device.

Figure 4A:
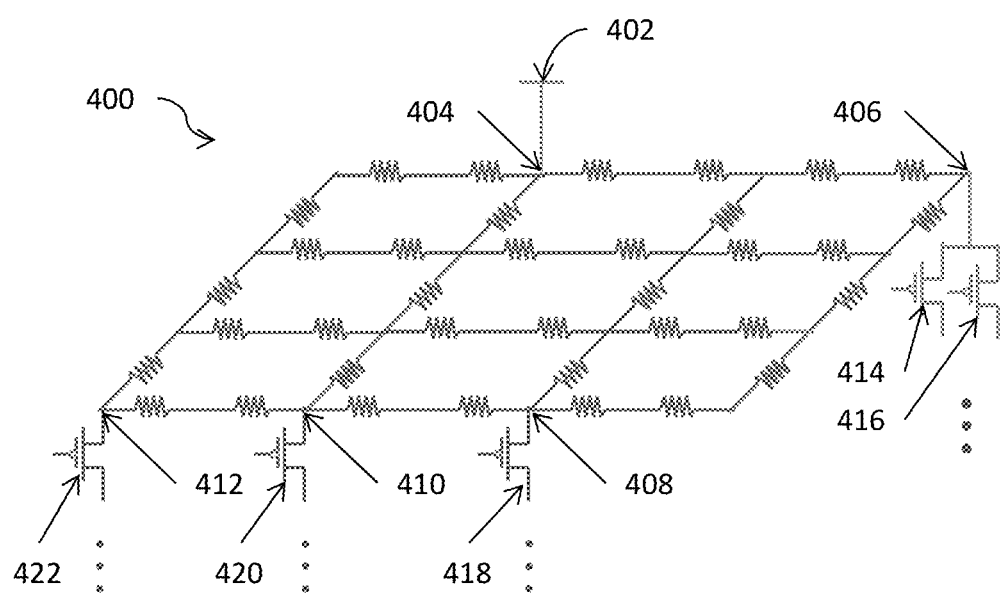
FIG. 4A illustrates an example of a simplified representation of a power network in some embodiments.

In the example illustrated in FIG. 4A, the power net 400 is connected to a power rail via a power pin 402. In contrast, the virtual power net 400B in FIG. 4B includes power pins 402B and 403B that respectively supply power to the MOS devices 414B and 416B that act as switches controlling power supplied to the virtual power net 400B.

A plurality of load devices powered by the power pin may be identified at 306 in the electronic design. For each load device, one or more first equivalent electrical characteristics may be computed and stored at 308. For example, a first equivalent electrical characteristic for a load device may be computed between the power input pin of the load device and the power pin identified at 304 and connected via the power net. These one or more first equivalent electrical characteristics represent the behavior of the electronic design prior to any circuit reduction. Depending upon the required or desired inputs for subsequent electrical analyses, different equivalent electrical characteristics may be computed at 308. For example, first equivalent resistances may be computed for the electronic design that may be the target of subsequent IR-drop analyses, while other types of equivalent electrical characteristics may also be computed for other types of electrical analyses.

One or more circuit reduction techniques may be identified at 310; and these one or more circuit reduction techniques are applied to the electronic design at 312 in one or more levels of reductions. In some embodiments, these one or more circuit reduction techniques may be applied to the power net (or virtual power net) to transform the power net into a reduced power net (or a reduced virtual power net) having a fewer total number of nodes each representing a circuit component in the reduced power net. In some of these embodiments, the reduced power net may include a few total number of pins or ports connecting the reduced power net to the load devices that are not subjects of circuit reduction in these embodiments.

Due to the reduction in the total number of nodes and the optional reduction in the total number of pins or ports by these one or more circuit reduction techniques, a port mapping between the original ports in the power net and the ports in the reduced power net may be determined at 314. This port mapping may be used to update the connectivity information that delineates how various circuit components (e.g., the load devices, etc.) are connected in the electronic design. For example, a port mapping may assume the form of port_map[i]=j, i<P, j<P', and P'<P, where i represents a port number in the power net having a total of P pins or ports, and j represents the mapped port number in the reduced power net having a total of P' pins or ports.

For each load device in the reduced electronic design, one or more second equivalent electrical characteristics may be computed and stored at 316. For example, a second equivalent resistance for a load device may be computed between the power input pin of the load device and the power pin connected via the reduced power net. These one or more second equivalent electrical characteristics represent the behavior of the electronic design after the circuit reduction at 312. Similar to the first equivalent electrical characteristics, different second equivalent electrical characteristics may be computed at 316 based upon the required or desired inputs for subsequent electrical analyses.

A load device having a power input port (e.g., a port connected to a voltage input) connected to the reduced power net may be identified at 318. In some embodiments, the identification of this power input port with respect to the reduced power net as well as the identification of the same power input port with respect to the power net may also be identified by using the port mapping determined at 316. These two identifications may be further referenced to derive the electrical characteristics of the port in the electronic design from one or more subsequent electrical analyses performed on the reduced electronic design with the reduced power net.

One or more compensation values of one or more electrical characteristics may be determined at 320 for the load device or at the port of the load device. In some embodiments, a compensation value of an electrical characteristic may be determined by comparing the first equivalent electrical characteristic value with the power net with the second equivalent electrical characteristic value with the reduced power net. For example, a compensation resistance value for a MOS device load device may be determined by computing the difference between the first equivalent resistance value between the power input pin of the MOS device load device and the power supply pin connected via the power net and the second equivalent resistance value between these two pins connected via the reduced power net in the reduced electronic design. This difference in these two resistance values may be used to compensate for the loss of accuracy during the circuit reduction that reduces the power net into the reduced power net.

A compensation circuit component having the compensation value may be inserted at 322 between the power input port of the identified load device and the power supply pin of the reduced power net. In the aforementioned example where the compensation value captures the difference in the equivalent resistance values caused by the application of circuit reduction techniques, a compensation resistor may be inserted between the power input pin of the load device and the power supply pin of the reduced net. In some embodiments, this compensation circuit component may be grouped and considered as a part of the reduced power net. In some embodiments, this compensation circuit component may be excluded from the reduced power net and may thus be considered as a part of the load device. In these latter embodiments, the load device and the compensation circuit component may be further transformed into a single transformed load device. More details about such a transformation are described below with reference to 324 and 326.

A modification factor for the load device may be determined at 324 based in part or in whole on the load device or the compensation circuit component. In some embodiments, the modification factor may be determined based in part or in whole upon the topology of the reduced electronic design. A load device and the compensation circuit component may thus be transformed at 326 into a single, transformed load device to simplify the electrical network for subsequent electrical analyses. In the aforementioned example where a load device comprises an MOS device and a compensation resistor connected in series with the MOS device to the reduced power net, the modification factor may be determined based in part or in whole upon the electrical characteristics of the MOS device. For example, the modification factor C may be determined by using the following formulae:

$$C = 1/(1 + R_{LJ} \times (g_{DS} + g_M + g_{MB})), \quad (1)$$

$$I'_{DS} = C \times I_{DS}, \quad (2)$$

$$g'_{DS} = C \times g_{DS}, \quad (3)$$

$$g'_M = C \times g_M, \quad (4)$$

$$g'_{MB} = C \times g_{MB}, \quad (5)$$

In the above formulae, $R_{LJ}$ denotes the compensation resistance value or the difference between the first equivalent resistance ($R_J$) between the power input pin of the MOS device and the power supply pin connected via the power net and the second equivalent resistance ($R_{J'}$) between the same two pins connected via the reduced power net. $R_{LJ}$ may thus be expressed as $R_{LJ} = R_J - R_{J'}$. $g_{DS}$ denotes the drain-source transconductance; $g_m$ denotes the transconductance; $g_{MB}$ denotes the back-gate transconductance that is smaller than $g_M$ of the MOS device; and $I_{DS}$ denotes the drain-source current of the MOS device. These electrical characteristics of a MOS device may be quickly determined by, for example, a simple look-up from a technology file provided by a semiconductor foundry.

As it can be seen from equations (1)-(5), the corresponding electrical characteristics for the transformed MOS device ($g'_{DS}$, $I'_{DS}$, $g'_M$, and $g'_{MB}$) may be quickly determined by computing the modification factor (C) and multiplying the electrical characteristics of the MOS device by this modification factor (C). As previously mentioned, these electrical characteristics of a MOS device may be quickly determined by a simple look-up from a technology file. Therefore, these corresponding electrical characteristic for the transformed MOS device may also be quickly determined with a few simple arithmetic operations. It shall be noted that other transformations and other types of load devices as well as compensation circuit components may also be used to simplify the circuit model for subsequent electrical analyses.

The reduced electronic design may thus be updated at 328 into an updated, reduced electronic design including the transformed load device in some embodiments. In these embodiments, rather than having a load device and a compensation circuit component, the reduced electronic design may be updated and simplified to include a single transformed load device whose electrical characteristics may be determined quickly and efficiently and thus conserve computational resources during subsequent electrical analyses and achieve a net gain in computational resources due to the iterative nature of at least some of the electrical analyses. The process may return to 318 to identify the next load device and repeat the tasks from 318 through 328 until a desired number or all of the load devices are similarly processed.

It shall be noted that the transformation of load devices and their respective compensation circuit components into transformed load devices is entirely optional, rather than required. Even when the transformation is performed, not all load devices and their respective compensation circuit components need to be transformed. Rather, the transformation may be applied to one or more but not all of the load devices in some embodiments or to all load devices in some other embodiments.

One or more electrical analyses may be performed at 330 on the updated, reduced electronic design to determine the behavior or electrical characteristics of the updated, reduced electronic design. For example, one or more electrical simulations may be performed on the updated, reduced electronic design to determine various electrical characteristics such as the currents, voltages, power, etc. at various nodes and through various net segments. These electrical characteristics and behavior obtained from the updated, reduced electronic design may be mapped back to the electronic design prior to the application of circuit reduction by using at least the port mapping determined at 314. Based on the results of the one or more electrical analyses performed at 330, the electronic design may be optionally modified at 332 to meet various rules, requirements, or objectives.

FIG. 4A illustrates an example of a simplified representation of a power network in some embodiments. The power net 400 connects the power pin 402 (e.g., Vdd) and a plurality of load devices at their respective ports. For example, the first and second load devices 414 and 416 are first connected in parallel and then connected to port (P1) 406; the third load device 418 is connected to port (P2) 408; the fourth load device 418 is connected to port (P3) 410; and the fifth load device 420 is connected to port (P4) 412. The power pin 402 is connected to the power net 400 at port (P0) 404.

Figure 4B:
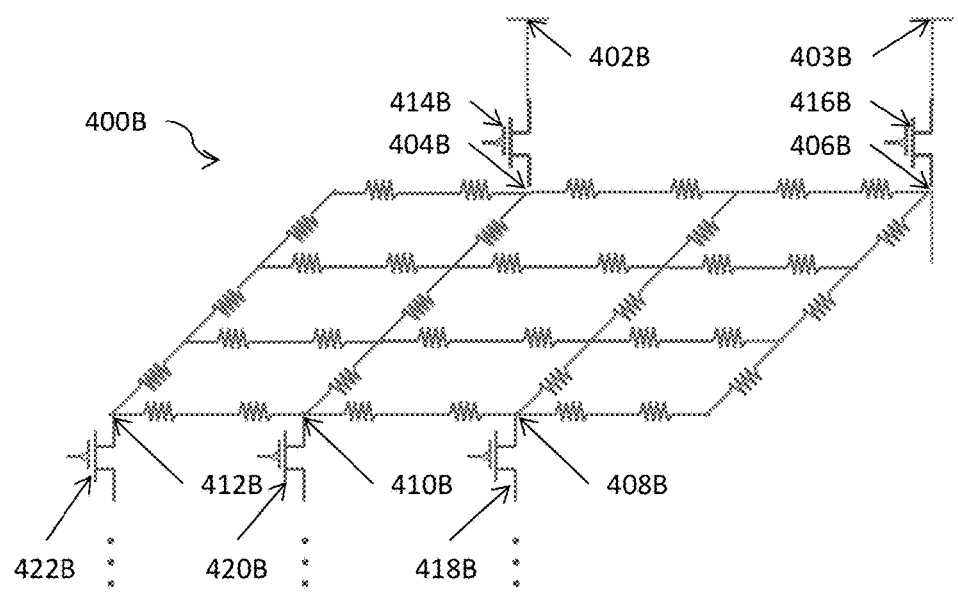
FIG. 4B illustrates an example of a simplified representation of a virtual power network in some embodiments.

FIG. 4B illustrates an example of a simplified representation of a virtual power network in some embodiments. The virtual power net 400B includes power pins 402B and 403B that are respectively connected to the virtual power net at ports 404B (P0') and 406B (P1') to supply power to the MOS devices 414B and 416B, which act as switches controlling power supplied to the virtual power net 400B. In this example, the first load device 418B is connected to port (P2') 408B; the second load device 420B is connected to port (P3') 410B; and the third load device 422B is connected to port (P4') 412.

Figure 5A:
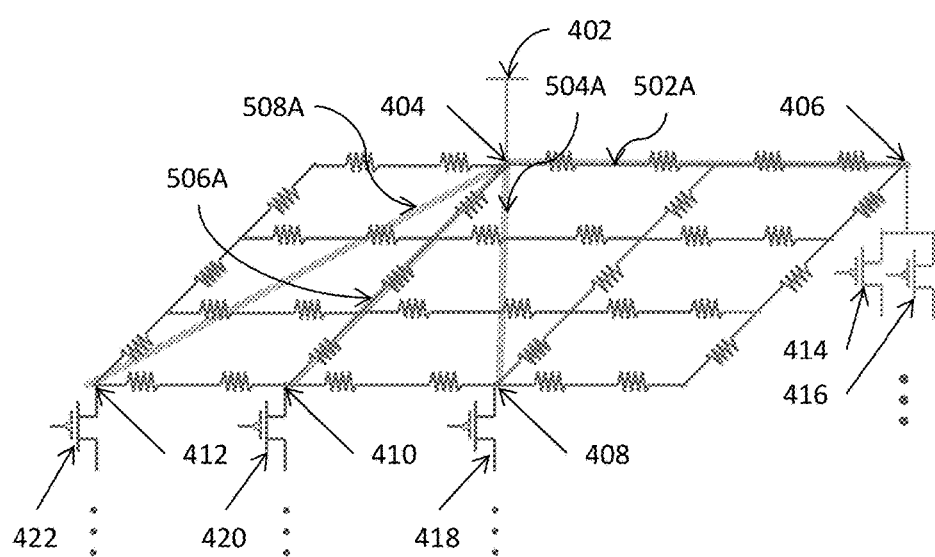
FIGS. 5A-5F jointly illustrate a working example of the application of various techniques for implementing an electronic design with electrical analyses with compensation circuit components to the example power net illustrated in FIG. 4A in some embodiments.

FIGS. 5A-5F jointly illustrate a working example of the application of various techniques for implementing an electronic design with electrical analyses with compensation circuit components to the example power net illustrated in FIG. 4A in some embodiments. In the example in FIG. 5A, the simplified electronic design is the same as that illustrated in FIG. 4A and thus inherits the reference numerals and description from FIG. 4A. This working example in FIGS. 5A-5F illustrates the application of various techniques to the example electronic design. More specifically, FIG. 5A illustrates the determination of first equivalent resistances between the power input ports of load devices 414, 416, 418, 420, and 422 where the paths 502A, 504A, 506A, and 508A schematically, rather than topologically, illustrate the two end points (e.g., pins or ports) between which an equivalent resistance is determined. For example, path 502A denotes that the equivalent electrical characteristic (e.g., equivalent resistance) is computed between port 406 and port 404 for the load devices 414 and 416. Path 504A denotes that the equivalent electrical characteristic (e.g., equivalent resistance) is computed between port 408 and port 404 for the load device 418. Path 506A denotes that the equivalent electrical characteristic (e.g., equivalent resistance) is computed between port 410 and port 404 for the load device 420. Path 508A denotes that the equivalent electrical characteristic (e.g., equivalent resistance) is computed between port 412 and port 404 for the load device 422. These first electrical characteristics may be stored for subsequent determination of compensation values of compensation circuit components.

Figure 5B:
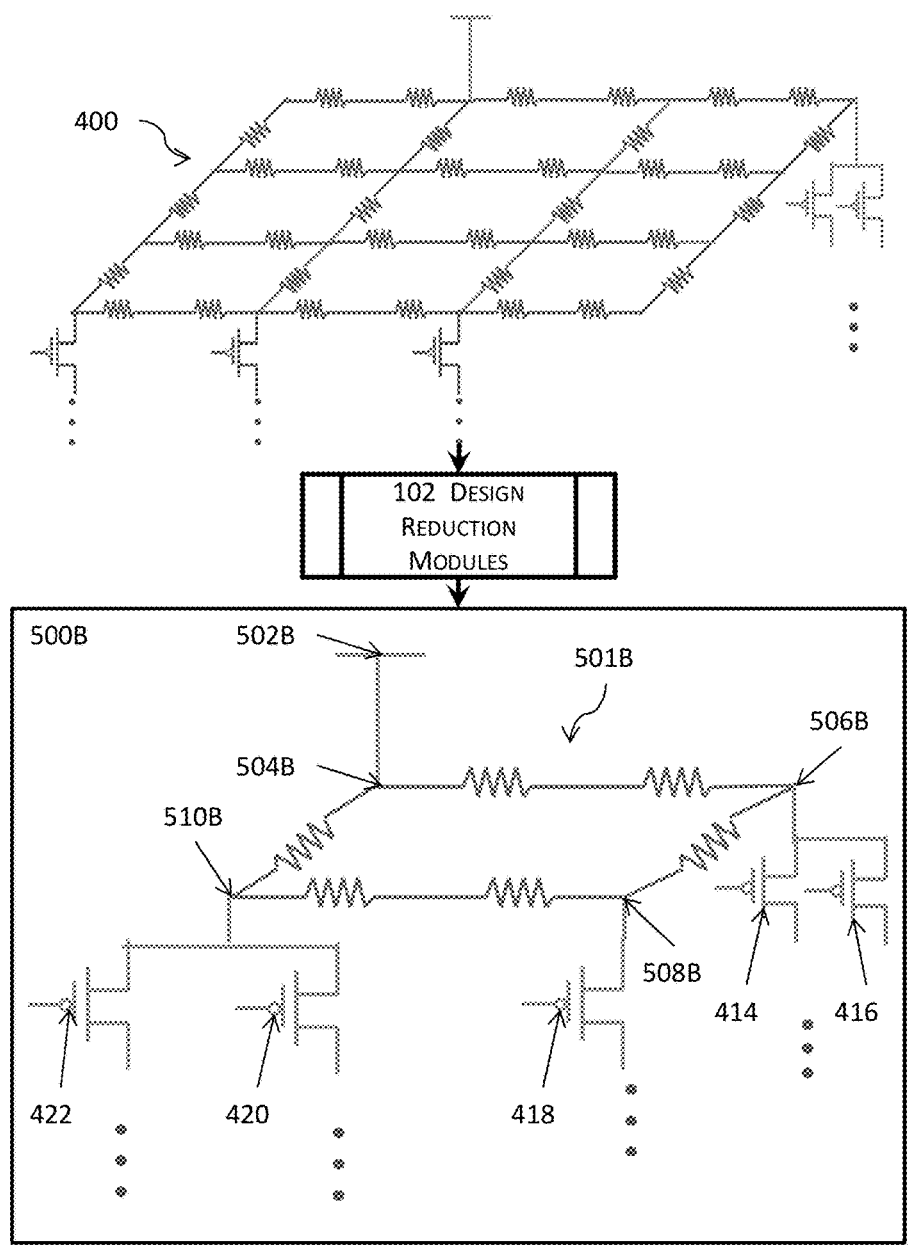

FIG. 5B illustrates the application of one or more circuit reduction techniques to the electronic design 400 in FIG. 5A into a reduced electronic design 500B. More specifically, the one or more design reduction modules 102 apply one or more circuit reduction techniques on the power net 400 to reduce the power net 400 in the electronic design into the reduced power net 501B. The reduced electronic design 500B includes the reduced power net 501B connected to the power pin 502B (Vdd) at port 504B. The reduced electronic design 500B further includes a plurality of load devices 414, 416, 418, 420, and 422. The load devices 414 and 416 are first connected in parallel and then connected to the reduced power net at port 506B. The load device 418 is connected to the reduced power net at port 508B. The load devices 420 and 422 are first connected in parallel and then connected to the reduced power net at a single port 510B.

Figure 5C:
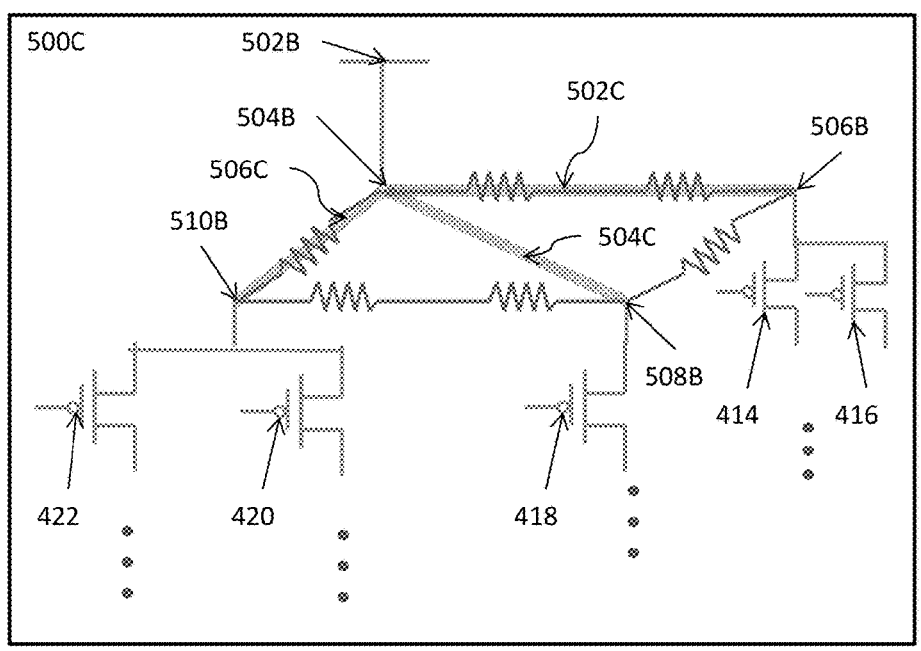

FIG. 5C illustrates the reduced electronic design 500C that may be generated by the one or more circuit reduction modules 102 as shown in FIG. 5B. FIG. 5C further illustrates the determination of second equivalent resistances between the power input ports of load devices 414, 416, 418, 420, and 422 where the paths 502C, 504C, and 506C schematically, rather than topologically, illustrate the two end points (e.g., pins or ports) between which an equivalent resistance is determined. For example, path 502C denotes that the equivalent electrical characteristic (e.g., equivalent resistance) is computed between port 506B and port 504B for the load devices 414 and 416. Path 504C denotes that the equivalent electrical characteristic may be computed between port 508B and port 504B for the load device 418. Path 506C denotes that the equivalent electrical characteristic may be computed between port 510B and port 504B for the load devices 420 and 422 connected in parallel as a result of the application of one or more circuit reduction techniques. These second electrical characteristics may be stored for subsequent determination of compensation values of compensation circuit components.

Figure 5D:
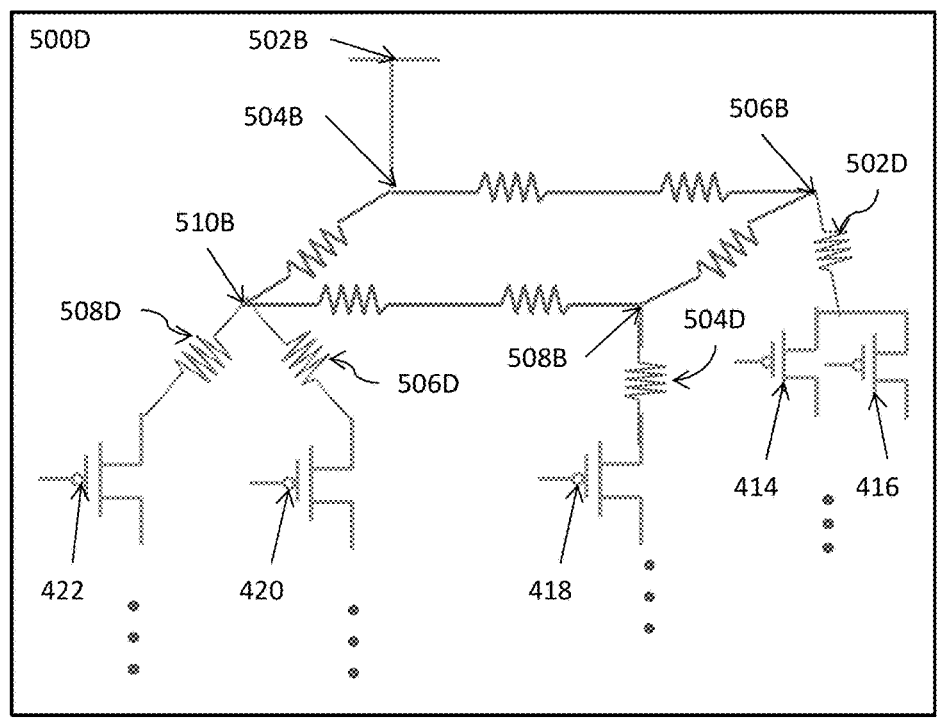

FIG. 5D illustrates the insertion of compensation circuit components into the reduced electronic design to compensate for the changes in the first electrical characteristics caused by the application of one or more circuit reduction techniques. As described above with reference to FIGS. 3A-3B, a compensation value may be determined by comparing the first electrical characteristic obtained with a power net with the second electrical characteristic determined with a reduced power net. In this example illustrated in FIGS. 5A-5F, a compensation resistor may be inserted between a load device and the reduced power net to compensate for the change in the equivalent resistance due to circuit reduction.

For example, a compensation resistor 502D may be inserted between the load devices 414 and 416 and the reduced power net at port 506B. A compensation resistor 504D may be inserted between the load device 418 and the reduced power net at port 508B. A compensation resistor 506D may be inserted between the load device 420 and the reduced power net at port 510B. A compensation resistor 508D may be inserted between the load device 422 and the reduced power net at port 510B. Furthermore, load devices 414 and 416 represent a multi-fingered MOS device and are thus connected in series with the compensation resistor 502D in series. On the other hand, load devices 420 and 422 represent individual MOS devices and are thus individually compensated for with compensation resistors 506D and 508D, respectively.

For the ease of explanation, it may be assumed that R1, R2, R3, and R4 respectively denote the equivalent resistances for the multi-fingered (two-fingered MOS device in this example) load device 414 and 416, the load device 418, the load device 420, and the load device 422 that are respectively connected to the power pin 402 via the power net. It may be further assumed that R1', R2', and R3' respectively denote the equivalent resistances for the two-fingered MOS device 414 and 416, the load device 418, and the parallel connected load devices 420 and 422 that are connected to the power pin 502B via the reduced power net.

With these equivalent resistances, compensation resistance values may be determined by comparing the equivalent resistance value determined with the power net with the equivalent resistance value determined with the reduced power net for a load device. For example, the compensation resistance for the compensation resistor 502D may be determined as (R1-R1'). The compensation resistance for the compensation resistor 504D may be determined as (R2-R2'). The compensation resistance for the compensation resistor 506D may be determined as (R3-R3'). The compensation resistance for the compensation resistor 508D may be determined as (R4-R3'). With these compensation resistance values determined, the compensation resistors 502D, 504D, 506D, and 508D may be fully characterized and inserted at their designated locations.

Figure 5E:
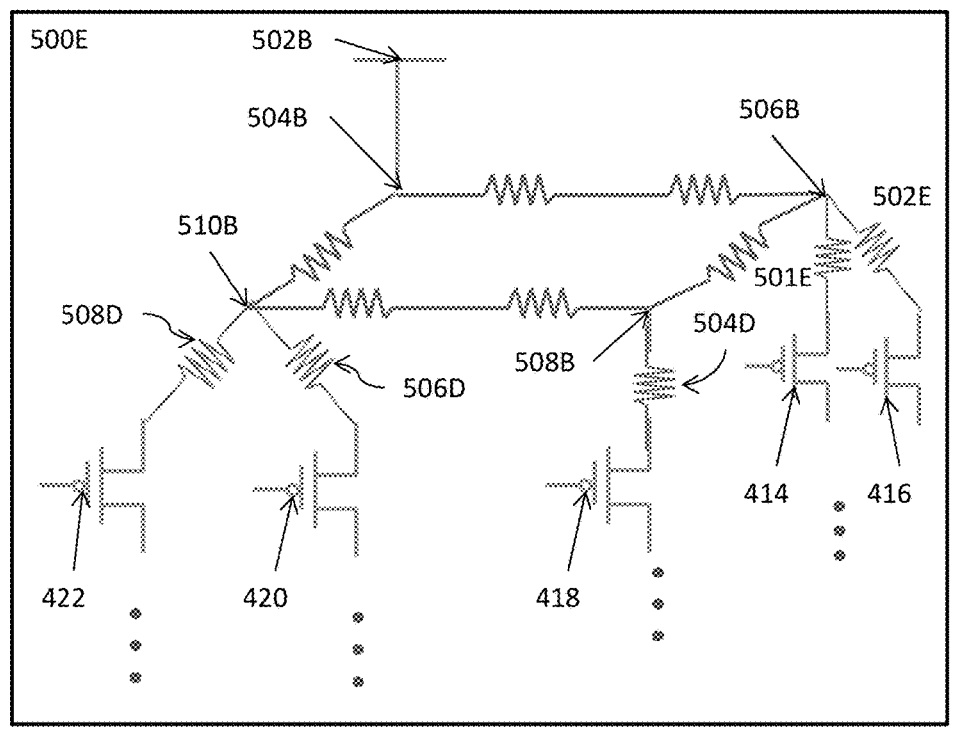

FIG. 5E illustrates further modification to the reduced electronic design illustrated in FIG. 5D after the insertion of compensation resistors. As described above with reference to reference numeral 326 of FIG. 3B, the electrical characteristics of a MOS device may be quickly determined by performing an expedient look-up from a technology file or a data structure (e.g., a database) storing various electrical characteristics that are process dependent and are thus generally provided by the semiconductor foundries.

Although the reduced circuit model illustrated in FIG. 5D may be directly provided to an electrical analysis module for electrical analyses, this reduced circuit model may be further modified to render the electrical analyses even more efficient. For example, the two-fingered MOS device 414 and 416 that are first connected in parallel and then connected to the same compensation resistor 502D may be separately connected to 506B with their respective compensation resistor. This modification may further simplify the reduced electronic design because these two MOS devices 414 and 416 are identical. As illustrated in FIG. 5E, MOS devices 414 and 416 are separately connected to their respective compensation resistors 501E and 502E. The resistance value of the compensation resistors is thus 2×(R1-R1'), where the multiplier "2" is determined by Kirchhoff circuit laws due to the parallel connection of the two identical MOS devices 414 and 416 in the two-fingered MOS device.

Figure 5F:
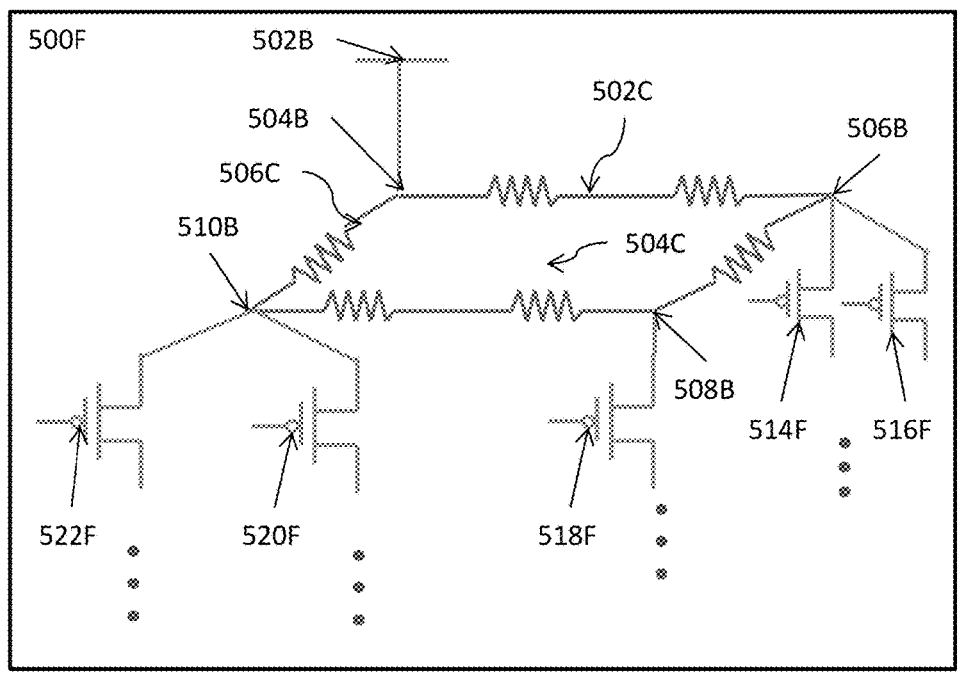

With this further modification to the reduced electronic design illustrated in FIG. 5E, each of the five MOS devices are separately connected to their respective compensation resistors in series. As described above, compensation circuit components may be grouped as a part of a reduced power net in some embodiments, whereas compensation circuit components may be excluded from the reduced power net and considered as a part of the plurality of load devices in some other embodiments. With MOS devices whose electrical characteristics may be quickly determined, grouping some or all compensation resistors as a part of the load devices may render the subsequent electrical analyses even more efficient by using the modification factor described above with reference to 324 in FIG. 3B. Once the modification factor is determined (e.g., by using the formulae described above), each pair of the load MOS device and its compensation resistor may be transformed into a transformed load MOS device (e.g., 514F, 516F, 518F, 520F, and 522F) as illustrated in FIG. 5F. The reduced electronic design in FIG. 5E may thus be further modified into a modified, updated electronic design 500F that may be provided to one or more electrical analysis modules to perform electrical analyses.

System Architecture Overview

Figure 6:
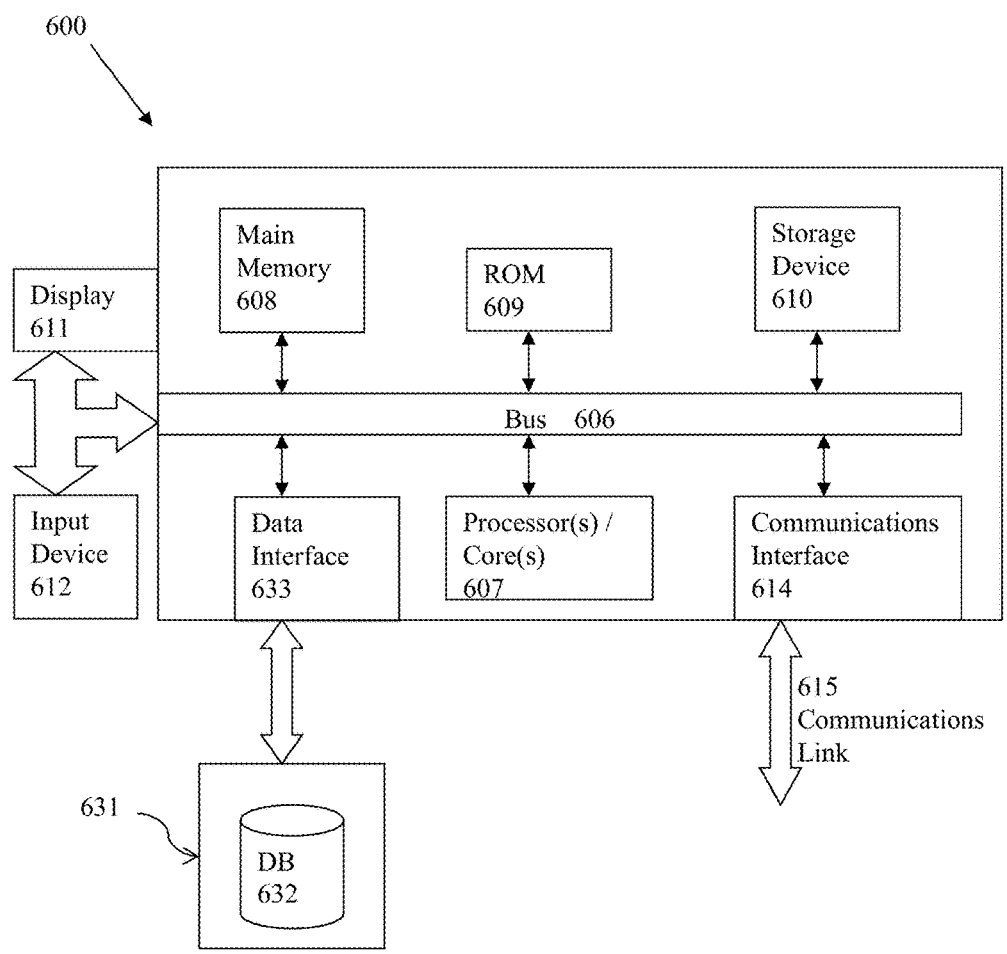
FIG. 6 illustrates a computerized system on which a process for implementing an electronic design with electrical analyses with compensation circuit components may be implemented.

FIG. 6 illustrates a computerized system on which a method for implementing an electronic design with electrical analyses with compensation circuit components may be implemented as described in the preceding paragraphs with reference to various figures. Computer system 600 includes a bus 606 or other communication module for communicating information, which interconnects subsystems and devices, such as processor 607, system memory 608 (e.g., RAM), static storage device 609 (e.g., ROM), disk drive 610 (e.g., magnetic or optical), communication interface 614 (e.g., modem or Ethernet card), display 611 (e.g., CRT or LCD), input device 612 (e.g., keyboard), and cursor control (not shown).

According to one embodiment, computer system 600 performs specific operations by one or more processor or processor cores 607 executing one or more sequences of one or more instructions contained in system memory 608. Such instructions may be read into system memory 608 from another computer readable/usable storage medium, such as static storage device 609 or disk drive 610. In alternative embodiments, hard-wired circuitry may be used in place of or in combination with software instructions to implement the invention. Thus, embodiments of the invention are not limited to any specific combination of hardware circuitry and/or software. In one embodiment, the term "logic" and "module" shall mean any combination of software and/or hardware that is used to implement all or part of the invention. In these embodiments, to the extent a "module" or "logic" includes any software portion, at least a part of the software portion is stored in a non-transitory computer readable storage medium (e.g., random access memory or RAM) for execution by one or more processors or one or more processor cores.

Various actions or processes as described in the preceding paragraphs may be performed by using one or more processors, one or more processor cores, or combination thereof 607, where the one or more processors, one or more processor cores, or combination thereof executes one or more threads. For example, the act of extracting, the act of determining, the act of representing, the act of generating, the act of performing one or more analyses, etc. may be performed by one or more processors, one or more processor cores, or combination thereof.

The term "computer readable storage medium" or "computer usable storage medium" as used herein refers to any non-transitory medium that participates in providing instructions to processor 607 for execution. Such a medium may take many forms, including but not limited to, non-volatile media and volatile media. Non-volatile media includes, for example, optical or magnetic disks, such as disk drive 610. Volatile media includes dynamic memory, such as system memory 608.

Common forms of computer readable storage media includes, for example, electromechanical disk drives (such as a floppy disk, a flexible disk, or a hard disk), a flash-based, RAM-based (such as SRAM, DRAM, SDRAM, DDR, MRAM, etc.), or any other solid-state drives (SSD), magnetic tape, any other magnetic or magneto-optical medium, CD-ROM, any other optical medium, any other physical medium with patterns of holes, RAM, PROM, EPROM, FLASH-EPROM, any other memory chip or cartridge, or any other medium from which a computer can read.

In an embodiment of the invention, execution of the sequences of instructions to practice the invention is performed by a single computer system 600. According to other embodiments of the invention, two or more computer systems 600 coupled by communication link 615 (e.g., LAN, PTSN, or wireless network) may perform the sequence of instructions required to practice the invention in coordination with one another.

Computer system 600 may transmit and receive messages, data, and instructions, including program, i.e., application code, through communication link 615 and communication interface 614. Received program code may be executed by processor 607 as it is received, and/or stored in disk drive 610, or other non-volatile storage for later execution. In an embodiment, the computer system 600 operates in conjunction with a data storage system 631, e.g., a data storage system 631 that includes a database 632 that is readily accessible by the computer system 600. The computer system 600 communicates with the data storage system 631 through a data interface 633.

A data interface 633, which is coupled to the bus 606 (e.g., memory bus, system bus, data bus, etc.), transmits and receives electrical, electromagnetic or optical signals that include data streams representing various types of signal information, e.g., instructions, messages and data. In embodiments of the invention, the functions of the data interface 633 may be performed by the communication interface 614.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

We claim:

1. A computer implemented method for implementing an electronic design with electrical analyses with compensation circuit components, comprising:
    generating, by a microprocessor, a reduced electronic design having a reduced power net at least by applying one or more circuit reduction techniques to at least a portion of an electronic design,
        the portion comprising at least a power net in the electronic design or a part of the power net;
    transforming, by the microprocessor, a plurality of circuit components connected to the power net or the reduced power net into a single transformed circuit component at least by:
        combining the plurality of circuit components and at least one compensation circuit component into the single transformed circuit component based at least in part upon a difference between the power net and the reduced power net; and
    generating, by the microprocessor, a physical implementation version of the electronic design based at least in part upon an electrical analysis with at least the reduced electronic design and the single transformed circuit component, wherein
        circuit behaviors of the physical implementation of the electronic design are not sensitive to a plurality of circuit reduction techniques that are characterized by being applicable to the electronic design to generate the reduced electronic design.

2. The computer implemented method of claim 1, wherein the act of reducing the electronic design comprises:
    generating the reduced power net at least by applying the one or more circuit reduction techniques to the power net.

3. The computer implemented method of claim 2, further comprising:
    computing a first equivalent electrical characteristic between the power pin and a power input pin of at least some of the plurality of circuit components that are connected via the power net; and
    computing a second equivalent electrical characteristic between the power pin and the power input pin of at least some of the plurality of circuit components connected via the reduced power net.

4. The computer implemented method of claim 3, further comprising:
    identifying the at least one compensation circuit component for the plurality of circuit components;
    determining a compensation value for the at least one compensation circuit component at least by comparing the first equivalent electrical characteristic and the second equivalent electrical characteristic; and
    inserting the at least one compensation circuit component between the plurality of circuit components and the reduced power net.

5. The computer implemented method of claim 4, further comprising:
    determining a modification factor for the plurality of circuit components based in part or in whole upon the plurality of circuit components or the at least one compensation circuit component; and
    transforming the plurality of circuit components and the at least one compensation circuit component into the single transformed circuit component by using at least the modification factor.

6. The computer implemented method of claim 5, further comprising:
    modifying the reduced electronic design into a modified reduced electronic design at least by replacing the plurality of circuit components with the single transformed circuit component.

7. The computer implemented method of claim 5, further comprising:
    identifying two or more load devices connected in parallel to the reduced power net;
    identifying a different compensation circuit component connected to the reduced power net and the two or more load devices; and
    modifying the reduced electronic design at least by inserting a modified compensation circuit component between the reduced power net and each load device of the two or more load devices based in part or in whole upon the different compensation circuit component.

8. The computer implemented method of claim 7, further comprising:
    transforming the each load device and the modified compensation circuit component into a different transformed load device by using at least the modification factor; and
    modifying the reduced electronic design into a modified reduced electronic design at least by replacing the each load device and the different compensation component with the different transformed load device.

9. The computer implemented method of claim 2, further comprising:
    generating a port mapping between the power net and the reduced power net.

10. An article of manufacture comprising a non-transitory computer accessible storage medium having stored thereupon a sequence of instructions which, when executed by at least one processor or at least one processor core executing one or more threads, causes the at least one processor or the at least one processor core to perform a set of acts for implementing an electronic design with electrical analyses with compensation circuit components, the set of acts comprising:

generating, by a microprocessor, a reduced electronic design having a reduced power net at least by applying one or more circuit reduction techniques to at least a portion of an electronic design,
the portion comprising at least a power net in the electronic design or a part of the power net;

transforming, by the microprocessor, a plurality of circuit components connected to the power net or the reduced power net into a single transformed circuit component at least by:
combining the plurality of circuit components and at least one compensation circuit component into the single transformed circuit component based at least in part upon a difference between the power net and the reduced power net; and generating, by the microprocessor, a physical implementation of the electronic design based at least in part upon an electrical analysis with at least the reduced electronic design and the single transformed circuit component, wherein
circuit behaviors of the physical implementation of the electronic design are not sensitive to a plurality of circuit reduction techniques that are characterized by being applicable to the electronic design to generate the reduced electronic design.

11. The article of manufacture of claim 10, the set of acts further comprising:

generating the reduced power net at least by applying the one or more circuit reduction techniques to the power net;

computing a first equivalent electrical characteristic between the power pin and a power input pin of the plurality of circuit components that are connected via the power net; and computing a second equivalent electrical characteristic between the power pin and the power input pin of the plurality of circuit components connected via the reduced power net.

12. The article of manufacture of claim 11, the set of acts further comprising:

identifying the at least one compensation circuit component for the plurality of circuit components connected to the reduced power net;

determining a compensation value for the at least one compensation circuit component at least by comparing the first equivalent electrical characteristic and the second equivalent electrical characteristic; and inserting the compensation circuit component between the plurality of circuit components and the reduced power net.

13. The article of manufacture of claim 11, the set of acts further comprising:

determining a modification factor for the plurality of circuit components based in part or in whole upon the plurality of circuit components or the at least one compensation circuit component;

transforms the plurality of circuit components and the at least one compensation circuit component into a transformed load device by using at least the modification factor; and modifying the reduced electronic design into a modified reduced electronic design at least by replacing the plurality of circuit components with the single transformed circuit component.

14. The article of manufacture of claim 13, the set of acts further comprising:

identifying two or more load devices connected in parallel to the reduced power net;

identifying a different compensation circuit component connected to the reduced power net and the two or more load devices; and modifying the reduced electronic design at least by inserting a modified compensation circuit component between the reduced power net and each load device of the two or more load devices based in part or in whole upon the different compensation circuit component.

15. The article of manufacture of claim 14, the set of acts further comprising:

transforming the each load device and the modified compensation circuit component into a different transformed load device by using at least the modification factor; and modifying the reduced electronic design into a modified reduced electronic design at least by replacing the each load device and the different compensation component with the different transformed load device.

16. A system for implementing an electronic design with electrical analyses with compensation circuit components, comprising:

non-transitory computer accessible storage medium storing thereupon program code; and at least one processor configured to execute the program code at least to:

generate, by the at least one processor, a reduced electronic design having a reduced power net at least by applying one or more circuit reduction techniques to at least a portion of an electronic design,
the portion comprising at least a power net in the electronic design or a part of the power net;

transform, by the at least one processor, a plurality of circuit components connected to the power net or the reduced power net into a single transformed circuit component at least by:
combining the plurality of circuit components and at least one compensation circuit component into the single transformed circuit component based at least in part upon a difference between the power net and the reduced power net; and generate, by the at least one processor, a physical implementation version of the electronic design based at least in part upon an electrical analysis with at least the reduced electronic design and the single transformed circuit component, wherein
circuit behaviors of the physical implementation of the electronic design are not sensitive to a plurality of circuit reduction techniques that are characterized by being applicable to the electronic design to generate the reduced electronic design.

17. The system for claim 16, wherein the at least one processor is further configured to generate the reduced power net at least by applying the one or more circuit reduction techniques to the power net, to compute a first equivalent electrical characteristic between the power pin and a power input pin of the plurality of circuit components connected via the power net, and to compute a second equivalent electrical characteristic between the power pin and the power input pin of the plurality of circuit components connected via the reduced power net.

18. The system for claim 17, wherein the at least one processor that is to identify the at least one compensation circuit component for the plurality of circuit components connected to the reduced power net, to determine a compensation value for the at least one compensation circuit component at least by comparing the first equivalent electrical characteristic and the second equivalent electrical characteristic, and to inserting the at least one compensation circuit component between the plurality of circuit components and the reduced power net.

19. The system for claim 18, wherein the at least one processor that is to determine a modification factor for the plurality of circuit components based in part or in whole upon the plurality of circuit components or the at least one compensation circuit component, to transform the plurality of circuit components and the at least one compensation circuit component into a transformed load device by using at least the modification factor, and to modify the reduced electronic design into a modified reduced electronic design at least by replacing the plurality of circuit components with the single transformed load device.

20. The system for claim 17, wherein the at least one processor that is to identify two or more load devices connected in parallel to the reduced power net, to identify a different compensation circuit component connected to the reduced power net and the two or more load devices, to modify the reduced electronic design at least by inserting a modified compensation circuit component between the reduced power net and each load device of the two or more load devices based in part or in whole upon the different compensation circuit component, to transform the each load device and the modified compensation circuit component into a different transformed load device by using at least the modification factor, and to modify the reduced electronic design into a modified reduced electronic design at least by replacing the each load device and the different compensation component with the different transformed load device.

* * * * *